US007243494B2

(12) United States Patent
Evans

(10) Patent No.: US 7,243,494 B2
(45) Date of Patent: Jul. 17, 2007

(54) RIDE CONTROL CIRCUIT FOR A WORK MACHINE

(75) Inventor: Terence Evans, Northants (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/245,211

(22) Filed: Oct. 7, 2005

(65) Prior Publication Data

US 2006/0075750 A1 Apr. 13, 2006

(30) Foreign Application Priority Data

Oct. 8, 2004 (GB) ................................ 0422372.3

(51) Int. Cl.
*F16D 31/02* (2006.01)

(52) U.S. Cl. ........................................................ 60/469

(58) Field of Classification Search .................. 60/469
See application file for complete search history.

(56) References Cited

U.S. PATENT DOCUMENTS 6,167,701 B1 1/2001 Hatcher et al.
6,260,355 B1 7/2001 Rausch et al.
6,370,874 B1 * 4/2002 Rausch et al. ................ 60/413

FOREIGN PATENT DOCUMENTS

GB 2 365 407 A 2/2002

* cited by examiner

*Primary Examiner*—F. Daniel Lopez
(74) *Attorney, Agent, or Firm*—Finnegan, Henderson, Farabow, Garrett & Dunner

(57) ABSTRACT

A hydraulic circuit for raising and lowering a load arm on a work machine is adapted to provide a ride control function which will cushion shocks through the load arm as the machine traverses rough terrain. The circuit includes a hydraulic ram that moves the load arm and a first hydraulic accumulator connected to a first chamber of a hydraulic ram. The accumulator provides a cushioning effect to the ram when the ride control function is engaged. The accumulator is located between a first control valve and a load hold valve of the circuit so that the load hold valve will hold the ram in position should there be any sudden pressure drop in or adjacent the accumulator. The accumulator can also be connected to a control surface of the load hold valve to simultaneously open the valve and cushion the ram. A second dedicated accumulator can also be introduced for this purpose if desired.

20 Claims, 4 Drawing Sheets

RIDE CONTROL CIRCUIT FOR A WORK MACHINE

TECHNICAL FIELD

The present disclosure relates to the field of work machines. More specifically, the present disclosure relates to a ride control circuit for use in work machines that include a hydraulic boom arrangement, such as wheeled loaders and telehandlers.

BACKGROUND

When a work machine such as a telehandler is carrying a payload over rough terrain, the hydraulic boom holding the payload experiences shocks from movements of the payload. These shocks are usually transferred directly to the machine via the boom. This makes the machine more susceptible to pitch and bounce, resulting in an uncompromising ride and an increase in operator fatigue. Hydraulic ride control circuits, that is hydraulic circuits that improve the ride quality of a work machine, are known. Such circuits conventionally selectively connect a hydraulic accumulator with the hydraulic ram arrangement of the boom in order to cushion any shocks experienced by the boom and ram. In cushioning the shocks, the circuit will normally permit a limited inward or outward movement of the ram (e.g. ±50 mm).

One example of such a circuit is disclosed in GB 2365407A to JC Bamford Excavators Limited. In GB '407, the hydraulic boom circuit includes a main control valve connected via first and second fluid lines to first and second sides of the hydraulic ram, respectively. By allowing pressurised fluid to flow into one side of the ram while simultaneously draining fluid from the other side of the ram back to a hydraulic reservoir, the control valve controls the movement of the ram and, consequently, the raising and lowering of the boom. For safety reasons, a hose burst valve, otherwise known as a load hold valve, is provided in the fluid circuit such that the ram will remain held in position should a flexible hose burst in the circuit between the control valve and the load hold valve.

In order to provide the cushioning effect, GB '407 includes an accumulator between the load check valve and the first side of the ram. A secondary control valve allows the accumulator to accumulate charge pressure during normal operation of the boom. When the ride control circuit of GB '407 is activated, the secondary control valve is energized and permits two-way flow between the accumulator and first side of the ram, the accumulator thus cushioning, via the ram, the shocks experienced by the boom during operation.

Furthermore, GB '407 also discloses the use of a further secondary control valve that controls fluid flow from the second side of the ram to a low pressure fluid reservoir. As with the other secondary control valve, this valve is opened when the ride control circuit is activated, thereby allowing fluid to drain from the second side of the ram to the reservoir should the ram move outwards by any degree when the ride control circuit is in operation.

One disadvantage with the system disclosed in GB '407 is that with the accumulator located between the load check valve and the first side of the ram, there is no safety mechanism to prevent the dropping of the boom should there be a sudden pressure loss in the accumulator, which could be caused by a burst hose, for example. Furthermore, as fluid from the second side of the ram is free to drain to a low pressure reservoir when the ride control circuit is engaged, the ram (and boom) are only effectively cushioned on one side, i.e. the first side of the ram, as no pressurised fluid remains on the second side of the ram.

It is an aim of the present invention to obviate or mitigate one or both of the aforementioned disadvantages.

SUMMARY OF THE INVENTION

According to the present disclosure, there is provided a hydraulic ride control circuit for a work machine having a loader arm, the circuit including a hydraulic ram having first and second chambers, the ram being adapted to raise and lower the loader arm. A first control valve is connected to the first and second chambers and adapted to feed pressurised fluid to one of the first and second chambers so as to selectively raise or lower the loader arm. A load hold valve is located between the first control valve and first chamber, the load hold valve having a hydraulic control surface and being movable between a first position in which fluid flow from the first chamber to the first control valve is prevented, and a second position in which fluid flow from the first chamber to the first control valve is permitted. A pressure-monitoring line connects the second chamber and the control surface of the load hold valve such that fluid pressure in the second chamber can act upon the control surface and move the load hold valve into the second position. A first hydraulic accumulator is connected to the first chamber and located between the first control valve and the load hold valve. A second control valve is connected between the first accumulator and the first chamber and movable between a first position in which fluid flow from the accumulator to the first chamber is prevented and a second position in which fluid flow from the accumulator to the first chamber is permitted. A third control valve is connected between the second chamber and the control surface of the load hold valve and movable between a first position in which fluid flow between the second chamber and the control surface in both directions is permitted, and a second position in which fluid flow between the second chamber and the control surface is prevented.

DETAILED DESCRIPTION

In each of the embodiments that will be described herein, the work machine upon which the disclosed circuit may be used is a telehandler. However, it should be understood that the disclosed embodiments are applicable to any work machine that utilizes a hydraulic ram for the raising and lowering of a loader arm or load-carrying boom.

Figure 1:
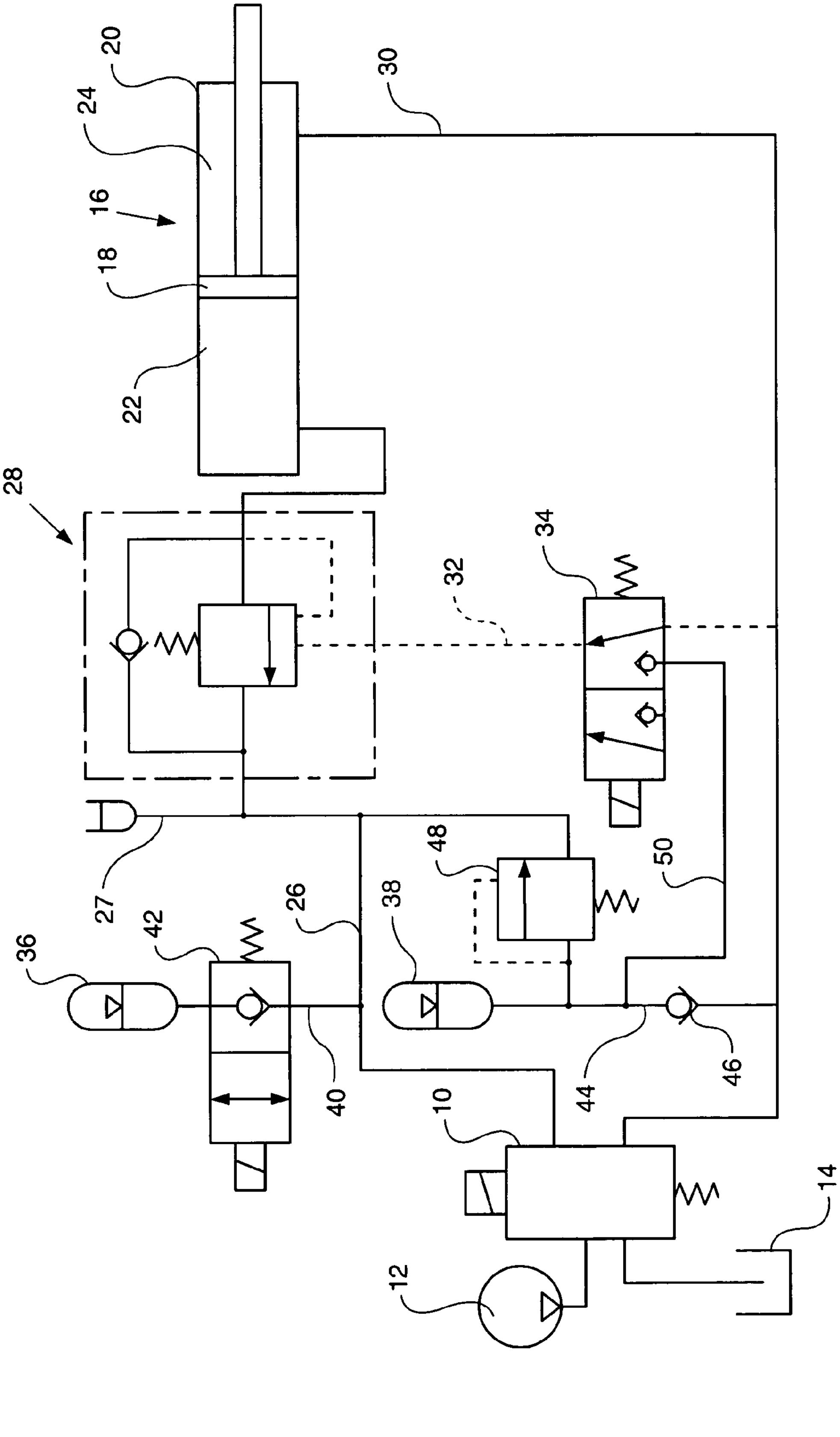
FIG. 1 shows a circuit diagram illustrating a first embodiment of a ride control circuit for a work machine, where the ride control function is disengaged.
Figure 2:
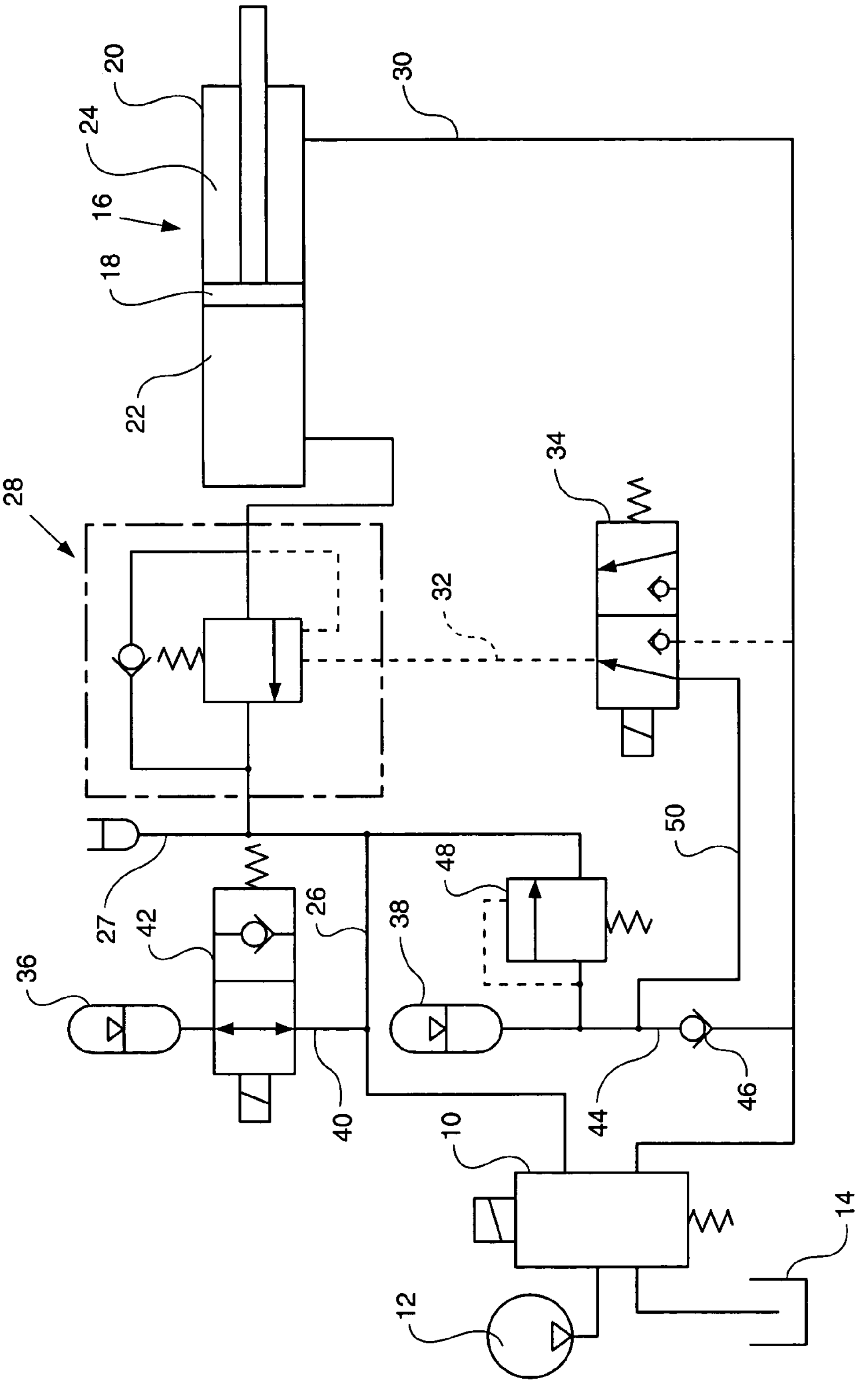
FIG. 2 shows the circuit of FIG. 1 when the ride control function is engaged.

Referring first to FIGS. 1 and 2, there is shown a hydraulic circuit for a work machine that, via a hydraulic ram, raises and lowers a loader arm, also known as a boom arm (not shown). The circuit comprises a first control valve 10 that receives pressurised hydraulic fluid from a pump 12. Also connected to the control valve 10 is a fluid reservoir 14 that receives hydraulic fluid from the low-pressure side of the circuit. The circuit further comprises a hydraulic ram, generally designated 16, which includes a piston 18 slidably located within a housing 20. The piston 18 divides the interior of the housing into first and second chambers 22,24. The control valve 10 is connected to the first chamber 22 via a first fluid line 26. Located on the first fluid line 26 between the control valve 10 and first chamber 22 is a check valve in the form of a load hold valve 28. The load hold valve 28 is provided to ensure that the piston and boom (not shown) will remain in position should there be a loss of hydraulic fluid, or sudden pressure drop, in the circuit between the load hold valve 28 and the first control valve 10. In a normal boom raise operation, the load hold valve 28 permits fluid flow from the control valve 10 to the first chamber 22, but prevents flow in the opposite direction. A pressure sensor 27 is also provided on the first fluid line 26 between the control valve 10 and the load hold valve 28. As pressurised fluid enters the first chamber 22, the piston 18 will move outwards (to the right in the figures) and raise the boom. At the same time, the outward movement of the piston 18 will force any fluid out of the second chamber and back to the control valve 10 and reservoir 14 via a second fluid line 30.

In order to lower the boom, the piston 18 must move inwards (to the left in the figures). In this instance, the control valve 10 supplies pressurised fluid to the second chamber 24 via second fluid line 30. A pressure-monitoring pilot line 32 connects the second fluid line 30 to a control surface of the load hold valve 28 so that a pilot pressure is provided at the load hold valve 28 should the pressure in the second chamber 24 and second fluid line 30 reach a certain level. This pilot pressure in the pilot line 32 opens the load hold valve 28, allowing fluid to flow back to the control valve 10 and reservoir 14 from the first chamber 22 as the piston 18 moves inwards.

In order for the above-described circuit to implement a ride control function, the circuit is supplemented with first and second hydraulic accumulators 36,38. The first accumulator 36 is located on the first fluid line 26 between the control valve 10 and the load hold valve 28. The first accumulator 36 is connected to the first fluid line 26 via a third fluid line 40, and the third fluid line 40 also includes a second control valve 42, in the form of a solenoid, which in its de-energized state (shown in FIG. 1) allows fluid to enter the accumulator 36 from the first fluid line 26, but not to exit. The second accumulator 38 is connected to the second fluid line 30 via a fourth fluid line 44 upon which is located a check valve 46. The check valve 46 allows fluid to flow into the accumulator 38 from the second fluid line 30, but not to exit back to the second fluid line 30. A pressure relief valve 48 may also be connected between the accumulator 38 and the first fluid line 26 to release pressurised fluid if the pressure in the second accumulator 38 rises above a predetermined level. A third control valve 34, again shown here as a solenoid valve, is provided in the pilot line 32, and in its de-energized state (as shown in FIG. 1) permits fluid flow from the second fluid line 30 into the pilot line 32. A fifth fluid line 50 connects the accumulator 38 with the third control valve 34.

The circuit shown in FIG. 1 illustrates the ride control circuit with the ride control function disengaged. Thus, the components of the circuit will operate as normal in order to raise or lower a boom connected to the hydraulic ram 16. During these operations, the second control valve 42 and the check valve 46 allow charge pressures to build in the accumulators 36,38.

In order to engage the ride control function an operator will push a switch, normally located in the cab of the machine. Pushing this switch will energize the second and third control valves 42,34 moving the circuit into the state shown in FIG. 2.

In their energized states, the second and third control valves 42, 34 connect the first and second accumulators 36,38 with the first fluid line 26 and pilot line 32, respectively. Connecting the second accumulator 38 to the pilot line 32 provides sufficient pressure to open the load hold valve 28. Connecting the first accumulator 36 into the first fluid line 26 increases the volume of the circuit, thereby providing a cushioning effect to the piston 18 via the now two-way load hold valve 28 and the first chamber 22. At the same time, the first control valve 10 can either close off or at least reduce flow from the second fluid line 30 to the hydraulic reservoir 14, thereby providing a degree of cushioning to the piston 18 from the second chamber side. In cushioning the piston 18, the accumulator 36 will permit piston 18 to move inwards or outwards by a relatively small amount (e.g. ±50 mm).

When the ride control function is engaged, the sensor 27 monitors for any sudden drop in pressure in the circuit between the load hold valve 28 and the control valve 10. If this occurs, a signal will be sent to de-energize the third control valve 34 thus cutting communication between the accumulator 38 and pilot line 32 and hence closing the load hold valve 28. In addition, the same signal will be sent to de-energize the control valve 34 should the sensor 27 itself fail.

This first embodiment of the ride control circuit is able to provide the ride control function alongside the normal raising and lowering of the boom. If the boom is to be operated while the ride control function is engaged, a signal is sent to the second and third control valves 42, 34 and the valves 42, 34 are de-energized, closing off the pressure from the accumulators 36, 38. Once the boom operation is complete, a further signal re-energizes the valves 42, 34 and the ride control function is re-engaged.

Figure 3:
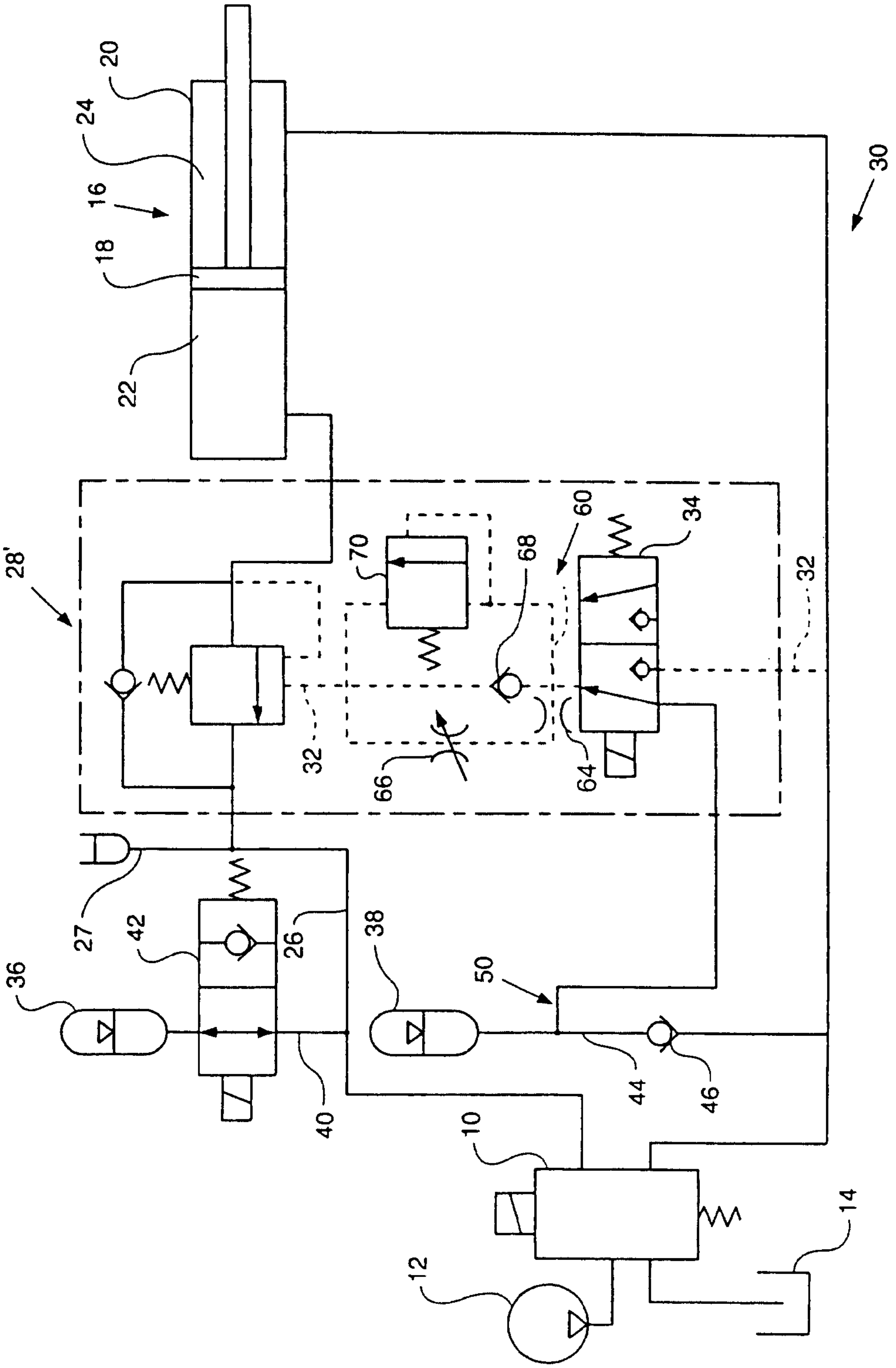
FIG. 3 shows a circuit diagram illustrating a second embodiment of a ride control circuit.

FIG. 3 illustrates a second embodiment of the ride control circuit. The second embodiment of the circuit shares the majority of its components with the first embodiment described above. Those shared components are designated by the same reference numbers as used to describe the first embodiment, and consequently will not be described further here. Where the second embodiment differs from the first embodiment is that the load hold valve 28' of the second embodiment includes a pressure-varying means, generally designated 60, here shown in the form of a pressure-varying valve, such as an over center valve, for example. In its de-energized form, the third control valve 34 prevents fluid flow from the second accumulator 38 to the pilot line 32. In its energized form, as shown in FIG. 3, the third control valve 34 allows fluid flow between the second accumulator 38 and the pilot line 32.

The over center valve 60 is located on the pilot line 32 and includes a pair of orifices 64, 66, a one-way valve 68 and a pilot valve 70 all arranged in parallel with one another between the third control valve 34 and the load hold valve 28'.

The sharing of the majority of components between the first and second embodiments of the circuit means that the circuits also operate in the same manner, save for the operation of the over center valve 60 and the load hold valve 28'. In normal operation of the circuit, with the ride control function disengaged, control valve 34 is de-energized and blocks any flow from the second accumulator 38 towards the load hold valve 28'. Instead, fluid flow in the second fluid line 30 can flow into the over center valve 60 and also the second accumulator 38, but cannot flow directly between the two. Fluid flow enters the over center valve 60 and as a result of the presence of the one-way valve 68, must pass through fixed orifice 64 and variable orifice 66 to reach the load hold valve 28'. If, due to the presence of the pair of orifices 64, 66, hydraulic pressure surpasses a certain level in the over center valve 60, pressurised hydraulic fluid will begin to act on a control surface of the pilot valve 70. If a sufficiently large pressure acts upon the pilot valve 70, the valve 70 will open and an increased pressure will act upon the control surface of the load hold valve. This will therefore allow fluid in the first chamber 22 of the hydraulic ram 16 to return via the first fluid line 26 when pressure in the second chamber 24 and second fluid line 30 reaches a certain level. Consequently, the boom will lower.

When the third control valve 34 is energized, as shown in FIG. 3, thereby allowing pressurised fluid from the second accumulator 38 to flow towards the load hold valve 28'. As already described above, the arrangement of the orifices 64, 66, one-way valve 68 and pilot valve 70 ensures that variable hydraulic pressure is applied to the control surface of the load hold valve 28' from the second accumulator 38.

Figure 4:
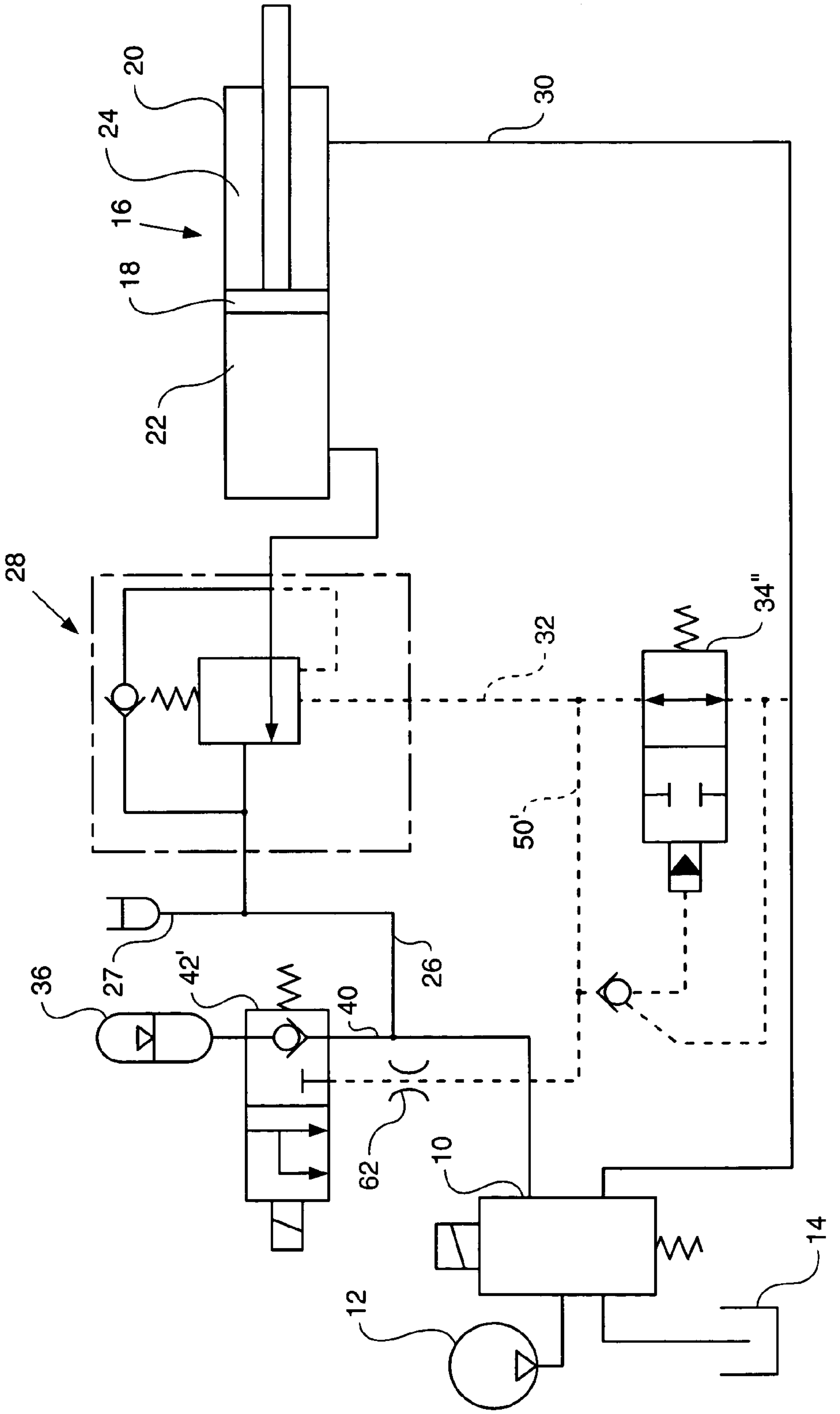
FIG. 4 shows a circuit diagram illustrating a third embodiment of a ride control circuit.

A third embodiment of ride control circuit is illustrated in FIG. 4. A number of the components of the third embodiment are shared with the previously-described first and second embodiments, and are again assigned the same reference numbers. The differences between the third embodiment and the preceding embodiments are that (i) there is only a single accumulator 36 in the circuit, and (ii) the second and third control valves 42', 34" are of different configurations than those previously described. The second control valve 42' is adapted to allow the accumulator 36 to simultaneously connect with both the hydraulic ram 16 and the control surface of the load hold valve 28 when the ride control function is engaged. This is achieved by selectively connecting the accumulator 36 to the pilot line 32 via fluid line 50' when the ride control function is engaged. The third control valve 34" in this embodiment is a pilot valve which will close the pilot line 32 when hydraulic pressure passes a pre-determined level in pilot line 32 and fluid line 50', whether the ride control function is engaged or disengaged.

FIG. 4 shows the hydraulic circuit when the ride control function is disengaged. As a result, fluid flow in the second fluid line 30 can flow through the open third control valve 34" and act upon the control surface of the load hold valve 28 when the boom is to be lowered. At the same time, the second control valve 42' is de-energized and will only allow fluid flow into the accumulator 36 from the first fluid line 26. This creates a charge pressure in the accumulator 36.

When the ride control function is engaged, the second control valve 42' is energized and moves to a position where it allows simultaneous fluid communication between the accumulator 36 and both the hydraulic ram 16 and the load hold valve 28. Thanks to this adaptation of the second control valve 42', the sole accumulator 36 can apply a pilot pressure sufficient to hold open the load hold valve 28 while simultaneously cushioning the movements of the piston 18. A fixed orifice 62 can be placed in the fluid line 50' if desired.

INDUSTRIAL APPLICABILITY

As explained above, the ride control circuits of the present disclosure as described above can be utilized on any work machine using a hydraulic boom. The entire circuit can be fitted during manufacture of the machine, or else the additional components can be retrofitted to a pre-existing boom raise hydraulic circuit on the machine.

The operation of the circuits ensures that the ride control function can be engaged and disengaged by an operator while the machine is on the move. There is therefore no need for the boom raise/lower circuit to have a zero pressure prior to engaging the ride control function. Furthermore, by connecting an accumulator to the control surface of the load hold valve, the present disclosed embodiments ensure that the cushioning of the ram piston can be undertaken without a significant pressure being present on the second chamber side of the circuit.

Furthermore, in the ride control circuit of the present disclosure, no components interfere with the operation of the load hold valve and hydraulic ram. Instead, by locating the first or sole accumulator between the first control valve and the load hold valve, the load hold valve can also hold the ram piston in position should there be a burst or sudden pressure drop in or adjacent the accumulator. Were the accumulator located between the load hold valve and hydraulic ram, the load hold valve would be ineffective were there to be a pressure drop in or adjacent the accumulator.

The present disclosed embodiments also benefit from being relatively straightforward to manufacture, particularly where only a single accumulator is required. Consequentially, the present disclosed embodiments are less costly to manufacture than previous proposals.

In the embodiments described above, except where specifically stated otherwise, each of the control valves used is an electronically controlled solenoid valve. However, it should be understood that the present disclosure is not limited to the use of solenoid control valves and that other types of control valve may be used instead. For example, the first control valve could be mechanically- or hydraulically-controlled. What is more, the second and third control valves could be hydraulically or electronically-operated.

Although the second embodiment described in FIG. 3 uses a pressure-varying valve in order to vary the pressure on the control surface of the load hold valve, it should be understood that any suitable pressure-varying means could be used instead.

Furthermore, although in the embodiments described above, the ride control function is temporarily disengaged when a boom raise or lower is required, the circuit of the present disclosure is also capable of carrying out a boom raise or lower without the need to disengage the ride control disclosure.

It will be apparent to those skilled in the art that various modifications and variations can be made in the disclosed ride control circuit for a work machine. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A hydraulic ride control circuit for a machine having a loader arm, the circuit including:

a hydraulic ram having first and second chambers, the ram being adapted to raise and lower the loader arm;

a first control valve connected to the first and second chambers and adapted to feed pressurized fluid to one of the first and second chambers so as to selectively raise or lower the loader arm;

a load hold valve located between the first control valve and first chamber, the load hold valve having a hydraulic control surface and being movable between a first position in which fluid flow from the first chamber to the first control valve is prevented, and a second position in which fluid flow from the first chamber to the first control valve is permitted;

a pressure-monitoring line connecting the second chamber and the control surface of the load hold valve such that fluid pressure in the second chamber can act upon the control surface and move the load hold valve into the second position;

a first hydraulic accumulator connected to the first chamber and located between the first control valve and the load hold valve;

a second control valve connected between the first accumulator and the first chamber and movable between a first position in which fluid flow from the accumulator to the first chamber is prevented and a second position in which fluid flow from the accumulator to the first chamber is permitted;

a third control valve connected between the second chamber and the control surface of the load hold valve and movable between a first position in which fluid flow between the second chamber and the control surface in both directions is permitted, and a second position in which fluid flow between the second chamber and the control surface is prevented; and a second hydraulic accumulator connected to both the second chamber and the third control valve, the second accumulator adapted to receive fluid flow from the second chamber, and wherein the third control valve prevents fluid flow from the second accumulator to the control surface when in its first position and permits fluid flow from the second accumulator to the control surface in its second position.

2. The circuit of claim 1, wherein the control surface of the load hold valve is also fluidly connected to the second control valve, such that when the second and third control valves are in their second positions, fluid flow from the accumulator to both the first chamber and control surface is permitted.

3. The circuit of claim 1, wherein the circuit further includes pressure-varying means located between the second chamber and the control surface of the load hold valve.

4. The circuit of claim 3, wherein the pressure-varying means is a pressure-varying valve.

5. The circuit of claim 1 further including a pressure relief valve connected between the second accumulator and the first control valve.

6. The circuit of claim 5, wherein the circuit further includes pressure-varying means located between the second chamber and the control surface of the load hold valve.

7. The circuit of claim 6, wherein the pressure-varying means is a pressure-varying valve.

8. A hydraulic ride control circuit for a machine having a loader arm, the circuit including:

a hydraulic ram having first and second chambers, the ram being adapted to raise and lower the loader arm;

a first control valve connected to the first and second chambers and adapted to feed pressurized fluid to one of the first and second chambers so as to selectively raise or lower the loader arm;

a load hold valve located between the first control valve and first chamber, the load hold valve having a hydraulic control surface and being movable between a first position in which fluid flow from the first chamber to the first control valve is prevented, and a second position in which fluid flow from the first chamber to the first control valve is permitted;

a pressure-monitoring line connecting the second chamber and the control surface of the load hold valve such that fluid pressure in the second chamber can act upon the control surface and move the load hold valve into the second position;

a first hydraulic accumulator connected to the first chamber and located between the first control valve and the load hold valve;

a second control valve connected between the first accumulator and the first chamber and movable between a first position in which fluid flow from the accumulator to the first chamber is prevented and a second position in which fluid flow from the accumulator to the first chamber is permitted;

a third control valve connected between the second chamber and the control surface of the load hold valve and movable between a first position in which fluid flow between the second chamber and the control surface in both directions is permitted, and a second position in which fluid flow between the second chamber and the control surface is prevented; and pressure-monitoring means located between the first accumulator and the load hold valve.

9. The circuit of claim 8, further including a low pressure fluid reservoir connected to the first control valve, wherein the first control valve is configured to restrict or prevent fluid flow to the fluid reservoir when the second and third control valves are in their second positions.

10. The circuit of claim 8, wherein the third control valve is a pilot valve.

11. A machine having a loader arm and a hydraulic ride control circuit for the loader arm, the circuit including:

a hydraulic ram having first and second chambers, the ram being adapted to raise and lower the loader arm;

a first control valve connected to the first and second chambers and adapted to feed pressurized fluid to one of the first and second chambers so as to selectively raise or lower the loader arm;

a load hold valve located between the first control valve and first chamber, the load hold valve having a hydraulic control surface and being movable between a first position in which fluid flow from the first chamber to the first control valve is prevented, and a second position in which fluid flow from the first chamber to the first control valve is permitted;

a pressure-monitoring line connecting the second chamber and the control surface of the load hold valve such that fluid pressure in the second chamber can act upon the control surface and move the load hold valve into the second position;

a first hydraulic accumulator connected to the first chamber and located between the first control valve and the load hold valve;

a second control valve connected between the first accumulator and the first chamber and movable between a first position in which fluid flow from the accumulator to the first chamber is prevented and a second position in which fluid flow from the accumulator to the first chamber is permitted;

a third control valve connected between the second chamber and the control surface of the load hold valve and movable between a first position in which fluid flow between the second chamber and the control surface in both directions is permitted, and a second position in which fluid flow between the second chamber and the control surface is prevented; and a second hydraulic accumulator connected to both the second chamber and the third control valve, the second accumulator adapted to receive fluid flow from the second chamber, and wherein the third control valve prevents fluid flow from the second accumulator to the control surface when in its first position and permits fluid flow from the second accumulator to the control surface in its second position.

12. The machine of claim 11 wherein the control surface of the load hold valve is also fluidly connected to the second control valve, such that when the second and third control valves are in their second positions, fluid flow from the accumulator to both the first chamber and control surface is permitted.

13. The circuit of claim 11, wherein the third control valve is a pilot valve.

14. The machine of claim 11, wherein the circuit further includes pressure-varying means located between the second chamber and the control surface of the load hold valve.

15. The machine of claim 14, wherein the pressure-varying means is a pressure-varying valve.

16. The machine of claim 11 further including a pressure relief valve connected between the second accumulator and the first control valve.

17. The machine of claim 16, wherein the circuit further includes pressure-varying means located between the second chamber and the control surface of the load hold valve.

18. The machine of claim 17, wherein the pressure-varying means is a pressure-varying valve.

19. The machine of claim 11, further including pressure-monitoring means located between the first accumulator and the load hold valve.

20. The machine of claim 11, further including a low-pressure fluid reservoir connected to the first control valve, wherein the first control valve is configured to restrict or prevent fluid flow to the fluid reservoir when the second and third control valves are in their second positions.

* * * * *